US012083481B2

(12) United States Patent
Lee

(10) Patent No.: US 12,083,481 B2
(45) Date of Patent: Sep. 10, 2024

(54) FOULING-RESISTANT REVERSE OSMOSIS MEMBRANE, METHOD FOR PRODUCING SAME, AND FOULING-RESISTANT REVERSE OSMOSIS MODULE INCLUDING SAME

(71) Applicant: Toray Advanced Materials Korea Inc., Gyeongsangbuk-do (KR)

(72) Inventor: Jong Min Lee, Gyeongsangbuk-do (KR)

(73) Assignee: Toray Advanced Materials Korea, Inc., Gyeongsangbuk-do (KR)

( * ) Notice: Subject to any disclaimer, the term of this patent is extended or adjusted under 35 U.S.C. 154(b) by 767 days.

(21) Appl. No.: 17/264,777

(22) PCT Filed: Jul. 31, 2019

(86) PCT No.: PCT/KR2019/009557
§ 371 (c)(1),
(2) Date: Jan. 29, 2021

(87) PCT Pub. No.: WO2020/027580
PCT Pub. Date: Feb. 6, 2020

(65) Prior Publication Data
US 2021/0291119 A1    Sep. 23, 2021

(30) Foreign Application Priority Data
Jul. 31, 2018    (KR) ................. 10-2018-0089091

(51) Int. Cl.
| | |
|---|---|
| *B01D 69/02* | (2006.01) |
| *B01D 61/02* | (2006.01) |
| *B01D 61/08* | (2006.01) |
| *B01D 65/08* | (2006.01) |
| *B01D 67/00* | (2006.01) |
| *B01D 69/00* | (2006.01) |
| *B01D 69/10* | (2006.01) |
| *B01D 69/12* | (2006.01) |
| *B01D 71/56* | (2006.01) |
| *B01D 71/82* | (2006.01) |
| *C02F 1/44* | (2023.01) |

(52) U.S. Cl.
CPC .......... *B01D 69/02* (2013.01); *B01D 61/025* (2013.01); *B01D 61/08* (2013.01); *B01D 65/08* (2013.01); *B01D 67/0006* (2013.01); *B01D 69/00* (2013.01); *B01D 69/10* (2013.01); *B01D 69/12* (2013.01); *B01D 69/125* (2013.01); *B01D 71/56* (2013.01); *B01D 71/82* (2013.01); *C02F 1/441* (2013.01); *B01D 2325/48* (2013.01); *C02F 2303/04* (2013.01); *C02F 2303/20* (2013.01)

(58) Field of Classification Search
None
See application file for complete search history.

(56) References Cited

U.S. PATENT DOCUMENTS

| | | | |
|---|---|---|---|
| 5,425,877 A | 6/1995 | Knappe | |
| 7,138,058 B2 | 11/2006 | Kurth et al. | |
| 2002/0070158 A1 | 6/2002 | Buecher et al. | |
| 2008/0032719 A1 | 2/2008 | Rosenberg | |
| 2008/0185332 A1 | 8/2008 | Niu et al. | |
| 2017/0144110 A1 | 5/2017 | Shimura et al. | |
| 2018/0133658 A1 | 5/2018 | Seo et al. | |
| 2018/0264411 A1 | 9/2018 | Herron | |
| 2019/0105208 A1 | 4/2019 | Saevecke et al. | |
| 2020/0040484 A1 | 2/2020 | Watanabe et al. | |
| 2021/0322927 A1 | 10/2021 | Cho et al. | |
| 2022/0011630 A1 | 1/2022 | Ko et al. | |
| 2022/0387936 A1 | 12/2022 | Lee et al. | |
| 2023/0008479 A1 | 1/2023 | Park et al. | |
| 2023/0039949 A1 | 2/2023 | Yoon et al. | |
| 2023/0347298 A1 | 11/2023 | Lee | |

FOREIGN PATENT DOCUMENTS

| | | |
|---|---|---|
| CN | 102715170 | 10/2012 |
| CN | 105694053 | 6/2016 |
| CN | 105771672 | 7/2016 |
| DE | 2020-15005969 | 11/2015 |
| EP | 1044718 | 10/2000 |
| JP | 11-009921 | 1/1999 |
| JP | 2000-354743 | 12/2000 |
| JP | 2003-245530 | 9/2003 |
| JP | 2004-202409 | 7/2004 |
| JP | 2007-111606 | 5/2007 |
| JP | 2007-167783 | 7/2007 |
| JP | 4103131 | 6/2008 |
| JP | 2009-045595 | 3/2009 |
| JP | 2009-149573 | 7/2009 |
| JP | 2011-005455 | 1/2011 |
| JP | 2014-083515 | 5/2014 |
| JP | 2017-000939 | 1/2017 |
| JP | 2017-047417 | 3/2017 |
| JP | 2017-119932 | 7/2017 |
| JP | 2018-126706 | 8/2018 |

(Continued)

OTHER PUBLICATIONS

Ramadan et al. "Review on Recent Applications of Antimicrobial Agents for Polyamide and Polypropylene." *Al-Azhar Bulletin of Science* (2012) 23.2-A: 1-28.
Royal Society of Chemistry, Antimony, Oct. 2019, 2 pages.

*Primary Examiner* — Krishnan S Menon
(74) *Attorney, Agent, or Firm* — Morrison & Foerster LLP

(57) ABSTRACT

The present invention relates to a fouling resistance reverse osmosis membrane, a method of manufacturing the same, and a fouling resistance reverse osmosis module including the same, and more specifically, to a fouling resistance reverse osmosis membrane, which has excellence in anti-fouling properties against fouling materials such as organic substances, inorganic substances, and the like, antimicrobial performance against microorganisms and the like, a flux, a salt removal rate, and retention of anti-fouling properties and antimicrobial performance, a method of manufacturing the same, and a fouling resistance reverse osmosis module including the same.

3 Claims, No Drawings

(56) References Cited

FOREIGN PATENT DOCUMENTS

| | | |
|---|---|---|
| KR | 10-0169484 | 10/1998 |
| KR | 10-0406735 | 11/2003 |
| KR | 10-2006-0011043 | 2/2006 |
| KR | 10-2009-0015087 | 2/2009 |
| KR | 10-2010-0008213 | 1/2010 |
| KR | 10-2011-0109387 | 10/2011 |
| KR | 10-2013-0000477 | 1/2013 |
| KR | 10-2014-0046952 | 4/2014 |
| KR | 10-2015-0077062 | 7/2015 |
| KR | 10-2015-0083048 | 7/2015 |
| KR | 10-1541654 | 8/2015 |
| KR | 10-2016-0037584 | 4/2016 |
| KR | 10-2017-0103541 | 9/2017 |
| KR | 10-2017-0112994 | 10/2017 |
| KR | 10-2017-0126693 | 11/2017 |
| KR | 10-1966114 | 8/2019 |
| WO | WO 2013/058986 | 4/2013 |
| WO | WO 2013/129610 | 9/2013 |
| WO | WO 2021/054626 | 3/2021 |
| WO | WO 2021/054642 | 3/2021 |
| WO | WO 2021/085766 | 5/2021 |

FOULING-RESISTANT REVERSE OSMOSIS MEMBRANE, METHOD FOR PRODUCING SAME, AND FOULING-RESISTANT REVERSE OSMOSIS MODULE INCLUDING SAME

CROSS REFERENCE TO RELATED APPLICATIONS

This application is a national stage application under 35 U.S.C. § 371 of International Application No. PCT/KR2019/009557, filed internationally on Jul. 31, 2019, which claims priority to and the benefit of Korean Patent Application No. 10-2018-0089091, filed on Jul. 31, 2018, the disclosures of which are incorporated herein by reference in their entirety.

BACKGROUND

1. Field of the Invention

The present invention relates to a fouling resistance reverse osmosis membrane, a method of manufacturing the same, and a fouling resistance reverse osmosis module including the same, and more specifically, to a fouling resistance reverse osmosis membrane, which has excellence in anti-fouling properties against fouling materials such as organic substances, inorganic substances, and the like, antimicrobial performance against microorganisms and the like, a flux, a salt removal rate, and retention of anti-fouling properties and antimicrobial performance, a method of manufacturing the same, and a fouling resistance reverse osmosis module including the same.

2. Discussion of Related Art

Reverse osmosis membranes are generally used to separate dissociated substances from a solution. Conventionally, reverse osmosis membranes have been used in the desalination process of salt (brackish) water or seawater, and the desalination process provides fresh water or pure water suitable for household, agricultural, and industrial use. The desalination process using the reverse osmosis membrane is a process of filtering dissolved ions or molecules from a solution by pressurizing salt water, and only water passes through the reverse osmosis membrane by pressurization. There are several conditions for commercial use of the desalination process using the reverse osmosis membrane, and a high salt rejection rate is one important condition. To be commercially used, typical reverse osmosis membranes are required to have a salt rejection rate of 97% or more.

Meanwhile, the general type of reverse osmosis membrane is a composite membrane composed of a microporous support layer formed by applying a hydrophobic polymer onto a polyester nonwoven fabric and a polyamide layer formed on the microporous support layer, and it is common that the polyamide layer is formed by interfacial polymerization of a multifunctional amine aqueous solution and a multifunctional acid halide organic solution. The microporous support layer serves to support the reverse osmosis membrane and has high flux characteristics, and salt separation performance is determined by the polyamide layer.

In this case, in order to be used for large-capacity commercial use, the reverse osmosis membrane needs to include a polyamide layer having a high salt rejection rate and allow a large amount of water to permeate even at relatively low pressures. Accordingly, research on a reverse osmosis membrane has been conducted with a focus on achieving a high salt removal rate, and furthermore, studies on increasing a flux and improving chemical resistance are continuing.

As described above, various attempts have been made to improve the performance of the polyamide reverse osmosis membrane, and a reverse osmosis membrane exhibiting high chemical resistance while having excellent separation and permeation performance has been proposed, but, among the physical properties of the membrane, properties related to the fouling of the membrane still remain unsolved.

Therefore, there is an urgent need to develop a separation membrane having excellence in anti-fouling properties against fouling materials such as organic substances, inorganic substances, and the like, antimicrobial performance against microorganisms and the like, a flux, a salt removal rate, and retention of anti-fouling properties and antimicrobial performance.

SUMMARY OF THE INVENTION

The present invention is directed to providing a fouling resistance reverse osmosis membrane, which has excellence in anti-fouling properties against fouling materials such as organic substances, inorganic substances, and the like, antimicrobial performance against microorganisms and the like, a flux, a salt removal rate, and retention of anti-fouling properties and antimicrobial performance, a method of manufacturing the same, and a fouling resistance reverse osmosis module including the same.

One aspect of the present invention provides a fouling resistance reverse osmosis membrane, which includes: a porous support; a porous polymer support layer; a polyamide layer formed by interfacial polymerization of a first solution including a multifunctional amine compound and a second solution including a multifunctional acid halide compound; and an antimicrobial layer provided by covalent bonding of an antimicrobial agent, which is a compound represented by the following Chemical Formula 1, to at least a portion of a surface of the polyamide layer.

[Chemical Formula 1]

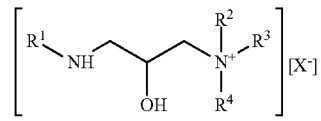

In Chemical Formula 1, $R^1$ to $R^4$ each independently represent a hydrogen ion or a $C_1$ to $C_{10}$ alkyl group, and $X^-$ represents a halide ion.

According to an exemplary embodiment of the present invention, the antimicrobial layer may be provided so as to entirely surround an outer surface of the polyamide layer.

In addition, the fouling resistance reverse osmosis membrane may have a flux of 24 GFD or more, a salt removal rate of 99% or more, and a flux reduction rate of less than 14%, as measured by the following Measurement Method 1.

[Measurement Method 1]

A flux and a salt removal rate are measured by operating the membrane in a sodium chloride (NaCl) aqueous solution with a concentration of 2,000 ppm at 25° C. and 225 psi for an hour, and a flux reduction rate is measured by operating the membrane in the same aqueous solution in the presence of dry milk for 2 hours and then measuring a ratio of a reduced flux to an initial flux.

Another aspect of the present invention provides a method of manufacturing a fouling resistance reverse osmosis membrane, which includes the steps of: (1) treating an upper surface of a porous support with a polymer solution to form a porous polymer support layer; (2) bringing the polymer support layer in contact with a first solution including a multifunctional amine compound and treating the resulting polymer support layer with a second solution including a multifunctional acid halide compound to form a polyamide layer on an upper surface of the polymer support layer; and (3) treating the polyamide layer with an antimicrobial layer-forming solution containing an antimicrobial agent, which is a compound represented by the following Chemical Formula 1, to form an antimicrobial layer covalently bonded to at least a portion of a surface of the polyamide layer.

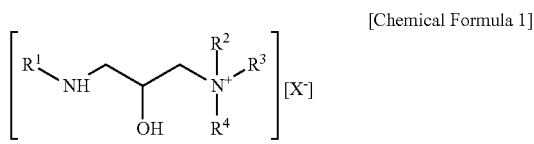

[Chemical Formula 1]

In Chemical Formula 1, $R^1$ to $R^4$ each independently represent a hydrogen ion or a $C_1$ to $C_{10}$ alkyl group, and $X^-$ represents a halide ion.

According to an exemplary embodiment of the present invention, the multifunctional amine compound in the step (2) may include one or more selected from the group consisting of m-phenylenediamine, p-phenylenediamine, o-phenylenediamine, and dimethylenepiperazine.

In addition, the multifunctional acid halide compound in the step (2) may include one or more selected from the group consisting of trimesoyl chloride, isophthaloyl chloride, terephthaloyl chloride, 1,3,5-cyclohexane tricarbonyl chloride, and 1,2,3,4-cyclohexane tetracarbonyl chloride.

In addition, the covalent bonding in the step (3) may be covalent bonding of a residual functional group of the acid halide compound of the polyamide layer with the antimicrobial agent which is a compound represented by Chemical Formula 1.

In addition, the antimicrobial agent may be contained at 0.001 to 0.6 wt % with respect to the total weight of the antimicrobial layer-forming solution.

In addition, the step (3) may be performed by treatment with the antimicrobial layer-forming solution containing the antimicrobial agent at 10 to 98° C. for 5 to 600 seconds.

In addition, the polymer solution in the step (1) may include one or more polymers selected from the group consisting of a polysulfone-based polymer, a polyamide-based polymer, a polyimide-based polymer, a polyester-based polymer, an olefin-based polymer, polyvinylidene fluoride, a polybenzimidazole polymer, and polyacrylonitrile.

In addition, the polymer solution in the step (1) may include one or more solvents selected from the group consisting of N-methyl-2-pyrrolidone (NMP), dimethylformamide (DMF), dimethyl sulfoxide (DMSO), and dimethylacetamide (DMAc).

Still another aspect of the present invention provides a fouling resistance reverse osmosis module including the above-described fouling resistance reverse osmosis membrane.

DETAILED DESCRIPTION OF EXEMPLARY EMBODIMENTS

Hereinafter, the present invention will be described in detail with reference to embodiments so that those skilled in the art can easily carry out the present invention. However, the present invention may be embodied in several different forms, and therefore, is not limited to embodiments described herein.

To facilitate understanding of a fouling resistance reverse osmosis membrane according to the present invention, a fouling resistance reverse osmosis membrane of the present invention will be described with reference to a manufacturing method to be described below.

A fouling resistance reverse osmosis membrane according to an embodiment of the present invention is manufactured by a method including the steps of: (1) treating an upper surface of a porous support with a polymer solution to form a porous polymer support layer; (2) bringing the polymer support layer in contact with a first solution including a multifunctional amine compound and treating the resulting polymer support layer with a second solution including a multifunctional acid halide compound to form a polyamide layer on an upper surface of the polymer support layer; and (3) treating the polyamide layer with an antimicrobial layer-forming solution containing an antimicrobial agent, which is a compound represented by the following Chemical Formula 1, to form an antimicrobial layer covalently bonded to at least a portion of a surface of the polyamide layer.

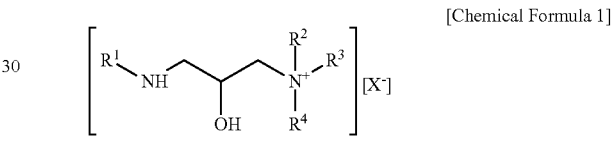

[Chemical Formula 1]

In Chemical Formula 1, $R^1$ to $R^4$ each independently represent a hydrogen ion or a $C_1$ to $C_{10}$ alkyl group, and $X^-$ represents a halide ion.

First, the step (1) of treating an upper surface of a porous support with a polymer solution to form a porous polymer support layer will be described.

The porous support may be used without limitation as long as it typically serves as a support for a reverse osmosis membrane in the art and is preferably a woven fabric, a knitted fabric, or a nonwoven fabric, and more preferably, a nonwoven fabric.

When the porous support is a nonwoven fabric, the type, fineness, length, basis weight, density, and the like of fiber included in the nonwoven fabric may be adjusted to control desired physical properties, such as porosity, pore diameter, strength, and permeability, and the like, of the support.

The material of the support may be used without limitation as long as it can typically serve as a support for a membrane and is used in a support for a typical membrane. Preferably, synthetic fibers selected from the group consisting of polyester, polypropylene, nylon, and polyethylene; or natural fibers such as cellulose-based fibers may be used.

The average pore diameter of the support is not limited as long as it is an average pore diameter of a support that can be typically used in the art. As a non-limiting example, the support may have an average pore diameter of 1 to 100 μm, and more preferably, 1 to 50 μm.

The support of the present invention preferably has a thickness of 20 to 150 μm. A support thickness less than 20 μm may adversely affect the strength of the entire membrane and a function as a support, and a support thickness more than 150 μm may cause a decrease in flux and a limitation in module processing.

In addition, the polymer solution to be treated on the upper surface of the porous support will be described.

First, a solvent included in the polymer solution is not particularly limited as long as it allows a polymer included in the polymer solution to be uniformly dissolved without formation of a precipitate. More preferably, N-methyl-2-pyrrolidone (NMP), dimethylformamide (DMF), dimethyl sulfoxide (DMSO), dimethylacetamide (DMAc), and the like may be used alone or in combination thereof.

As the polymer, any polymer included in a polymer support layer for a typical reverse osmosis membrane may be used, and the polymer preferably has a weight-average molecular weight of 65,000 to 150,000 in consideration of mechanical strength. As an exemplary example, any one or more selected from the group consisting of a polysulfone-based polymer, a polyamide-based polymer, a polyimide-based polymer, a polyester-based polymer, an olefin-based polymer, polyvinylidene fluoride, a polybenzimidazole polymer, and polyacrylonitrile may be used.

The polymer solution preferably includes the above-described polymer at 7 to 35 wt %. When the polymer is included at less than 7 wt %, strength is degraded, and the viscosity of the solution is lowered, and thus it may be difficult to manufacture a membrane. When the polymer is included at more than 35 wt %, the concentration of the polymer solution is excessively increased, and thus it may be difficult to manufacture a membrane.

The polymer support layer used in the reverse osmosis membrane of the present invention is a common microporous support layer, and there is no particular limitation on the type thereof, but the support layer generally needs to have a pore size that is sufficient to allow permeable water to permeate and appropriate for not interfering with crosslinking of an ultra-thin film formed thereon. In this case, the porous support layer preferably has a pore diameter of 1 to 500 nm, and when the pore diameter is more than 500 nm, the ultra-thin film sinks into the pore after being formed, and thus it may be difficult to achieve a required smooth sheet structure.

Next, the step (2) of immersing the polymer support layer in a first solution including a multifunctional amine compound and treating the resulting polymer support layer with a second solution including a multifunctional acid halide compound to form a polyamide layer on an upper surface of the polymer support layer will be described.

The multifunctional amine compound included in the first solution is a material having 2 to 3 amine functional groups per monomer and may be a polyamine including primary amines or secondary amines. In this case, as the polyamine, m-phenylenediamine, p-phenylenediamine, o-phenylenediamine, or an aromatic primary diamine, which is a substitution product, may be used, and, as another example, an aliphatic primary diamine, a cycloaliphatic primary diamine such as cyclohexene diamine, a cycloaliphatic secondary amine such as piperazine, an aromatic secondary amine, or the like may be used. More preferably, among the multifunctional amine compounds, m-phenylenediamine is used, and, in this case, an aqueous solution containing m-phenylenediamine at 0.5 to 10 wt % is preferred, and more preferably, m-phenylenediamine is contained at 1 to 4 wt %.

The polymer support layer may be immersed in the first solution including the amine compound for 0.1 to 10 minutes, and preferably, 0.5 to 1 minute.

In addition, the multifunctional acid halide compound included in the second solution may be used alone or in combination of any one or more selected from the group consisting of trimesoyl chloride, isophthaloyl chloride, terephthaloyl chloride, 1,3,5-cyclohexane tricarbonyl chloride, and 1,2,3,4-cyclohexane tetracarbonyl chloride.

The multifunctional acid halide compound may be dissolved at 0.01 to 2 wt %, and preferably, 0.05 to 0.3 wt %, in an aliphatic hydrocarbon solvent. In this case, as the aliphatic hydrocarbon solvent, a mixture of a C5 to C12 n-alkane and structural isomers of a C8 saturated or unsaturated hydrocarbon or a C5 to C7 cyclic hydrocarbon is preferably used. In the formation of the polyamide layer of the present invention, the support layer having been treated with the multifunctional amine-containing aqueous solution may be treated with the multifunctional acid halide compound for 0.1 to 10 minutes, and preferably, 0.5 to 1 minute.

Next, the step (3) of treating the polyamide layer with an antimicrobial layer-forming solution containing an antimicrobial agent to form an antimicrobial layer covalently bonded to at least a portion of a surface of the polyamide layer will be described.

The antimicrobial agent is covalently bonded to at least a portion of a surface of the polyamide layer to form an antimicrobial layer, and the antimicrobial agent includes a compound represented by the following Chemical Formula 1.

[Chemical Formula 1]

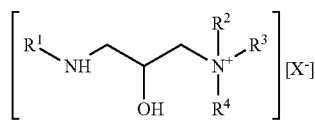

In Chemical Formula 1, $R^1$ to $R^4$ each independently represent a hydrogen ion or a $C_1$ to $C_{10}$ alkyl group, and $X^-$ represents a halide ion. Preferably, $R^1$ to $R^4$ each independently represent a $C_1$ to $C_6$ alkyl group, and $X^-$ represents $F^-$ or $Cl^-$, and more preferably, $R^1$ to $R^4$ each independently represent a $C_1$ to $C_4$ alkyl group, and $X^-$ is $Cl^-$.

Meanwhile, the covalent bonding in the step (3) may be covalent bonding of a residual functional group of the acid halide compound of the polyamide layer with the antimicrobial agent which is a compound represented by Chemical Formula 1.

When the antimicrobial agent, which is a compound represented by Chemical Formula 1, is covalently bonded to at least a portion of a surface of the above-described polyamide layer to form the antimicrobial layer, anti-fouling properties against fouling materials such as inorganic substances, organic substance, and microorganisms may be improved, and remarkably excellent anti-fouling properties under various raw water conditions such as salt (brackish) water, waste water, and seawater and excellent endurance may be achieved. Accordingly, since the fouling resistance reverse osmosis membrane of the present invention may be fundamentally prevented from membrane fouling that occurs during operation, it is possible to reduce operating costs and improve operating efficiency and the lifetime of the membrane by extending the cleaning cycle compared to a conventionally commercialized membrane. Therefore, the fouling resistance reverse osmosis membrane may be used for various applications.

Meanwhile, in the step (3), the polyamide layer may be treated with the antimicrobial layer-forming solution containing the antimicrobial agent at 10 to 98° C., and preferably, 20 to 95° C. for 5 to 600 seconds, preferably 10 to 300 seconds, and more preferably 20 to 240 seconds to form an antimicrobial layer. When the above-described temperature condition for treatment with the antimicrobial layer-forming solution is not satisfied, an antimicrobial layer is not easily formed, and thus anti-fouling properties and antimicrobial performance may be degraded, and retention of anti-fouling properties and antimicrobial performance may also be degraded. In addition, when the treatment time is less than 5 seconds, a desired level of antimicrobial layer is not formed, and thus anti-fouling properties and antimicrobial performance may be degraded, and retention of anti-fouling properties and antimicrobial performance may also be degraded. On the other hand, when the treatment time is more than 600 seconds, an initial flux and a salt removal rate may be degraded.

In this case, the treatment with the antimicrobial layer-forming solution may be performed by a typical method, and preferably, by spraying or impregnation, but the present invention is not limited thereto.

The antimicrobial agent may be contained at 0.001 to 0.6 wt %, preferably 0.005 to 0.5 wt %, and more preferably 0.01 to 0.45 wt % with respect to the total weight of the antimicrobial layer-forming solution. When the content of the antimicrobial agent is less than 0.001 wt % with respect to the total weight of the antimicrobial layer-forming solution, anti-fouling properties and antimicrobial performance may be degraded, and retention of anti-fouling properties and antimicrobial performance may also be degraded. On the other hand, when the content of the antimicrobial agent is more than 0.6 wt %, an initial flux and a salt removal rate may be degraded.

Meanwhile, the method of manufacturing a fouling resistance reverse osmosis membrane according to the present invention may further include, after the step (3), the step (4) of performing cleaning with each of a basic aqueous solution and distilled water at 20 to 95° C. for 1 to 150 minutes to remove residue and impurities, but the present invention is not limited thereto.

The fouling resistance reverse osmosis membrane of the present invention, which is manufactured by the above-described manufacturing method, includes: a porous support; a porous polymer support layer; a polyamide layer formed by interfacial polymerization of a first solution including a multifunctional amine compound and a second solution including a multifunctional acid halide compound; and an antimicrobial layer provided by covalent bonding of an antimicrobial agent, which is a compound represented by Chemical Formula 1, to at least a portion of a surface of the polyamide layer.

Regarding the description of the fouling resistance reverse osmosis membrane according to the present invention to be described below, the same description as in the above description of the method of manufacturing a fouling resistance reverse osmosis membrane will be omitted.

Meanwhile, the bonding structure of the porous support, polymer support layer, and polyamide layer included in the fouling resistance reverse osmosis membrane according to the embodiment of the present invention may vary, and the fouling resistance reverse osmosis membrane may have various bonding structures in which individual layers are provided as multiple layers, the polymer support layer and the polyamide layer are sequentially stacked on both surfaces of the porous support, and the like, but the present invention is not particularly limited thereto. As an example, the fouling resistance reverse osmosis membrane according to the present invention may include a porous support, a polymer support layer provided on an upper surface of the porous support, and a polyamide layer provided on an upper surface of the polymer support layer.

As described above, the antimicrobial layer may be provided on at least a portion of a surface of the polyamide layer and is preferably provided to entirely surround an outer surface of the polyamide layer. Accordingly, excellent anti-fouling properties against fouling materials such as organic substances, inorganic substances, and the like, excellent antimicrobial performance against microorganisms and the like, an excellent flux, an excellent salt removal rate, and excellent retention of anti-fouling properties and antimicrobial performance may be exhibited at the same time.

Meanwhile, the fouling resistance reverse osmosis membrane according to the present invention may have a flux of 24 GFD or more (preferably 25 GFD or more), a salt removal rate of 99% or more (preferably 99.5% or more), and a flux reduction rate of less than 14% (preferably less than 12%, and more preferably, less than 5%), as measured by the following Measurement Method 1.

[Measurement Method 1]

A flux and a salt removal rate are measured by operating the membrane in a sodium chloride (NaCl) aqueous solution with a concentration of 2,000 ppm at 25° C. and 225 psi for an hour, and a flux reduction rate is measured by operating the membrane in the same aqueous solution in the presence of dry milk for 2 hours and then measuring a ratio of a reduced flux to an initial flux.

In addition, the present invention provides a fouling resistance reverse osmosis module including the above-described fouling resistance reverse osmosis membrane according to the present invention.

The configuration of the reverse osmosis module may be the same as that of a reverse osmosis module typically used in the art. As a non-limiting example, the reverse osmosis membrane may be spirally wound around a porous permeable water outlet pipe along with a spacer for forming a flow channel, and end caps may be included at both ends of the wound membrane for the shape stability of the wound membrane. The material, shape, and size of the spacer and end cap may be the same as those of a spacer and an end cap used in a typical reverse osmosis module. The reverse osmosis membrane wound as described above may be housed in an outer case, and the material, size, and shape of the outer case may also be the same as those of an outer case used in a typical reverse osmosis module.

In addition, the reverse osmosis module according to the exemplary embodiment of the present invention may include the reverse osmosis membrane according to the present invention in a spirally wound state around a porous permeable water outlet pipe in the outer case.

According to the fouling resistance reverse osmosis membrane, method of manufacturing the same, and fouling resistance reverse osmosis module including the same of the present invention, anti-fouling properties against fouling materials such as organic substances, inorganic substances, and the like and antimicrobial performance against microorganisms and the like can be excellent, and a flux, a salt removal rate, and retention of anti-fouling properties and antimicrobial performance can also be excellent.

Hereinafter, the present invention will be described with reference to exemplary embodiments, but the exemplary embodiments are provided for illustrative purposes and are not intended to limit the scope of the present invention.

EXAMPLES

Example 1: Manufacture of Fouling Resistance Reverse Osmosis Membrane

A polymer solution including dimethylformamide as a solvent and polysulfone as a polymer at 17.5 wt % was casted with an average thickness of 125 μm onto a polyester nonwoven fabric, and the resulting material was immediately immersed in 25° C. distilled water to induce phase transition, thereby forming a polymer support layer. Then, the resulting material was sufficiently washed to remove the solvent and water in the support layer and then stored in pure water. Afterward, the polymer support layer was immersed in a first solution (aqueous solution) including m-phenylenediamine at 2.25 wt % as a multifunctional amine compound for a minute, and then the aqueous solution layer on the surface was removed by compression. Subsequently, the resulting polymer support layer was immersed in a second solution (organic solution) including trimesoyl chloride at 0.07 wt % and isophthaloyl chloride at 0.03 wt % as multifunctional acid halide compounds for a minute to induce interfacial polymerization and then dried at 25° C. for a minute to form a polyamide layer on an upper surface of the polymer support layer.

Immediately after being formed, the polyamide layer was immersed in an antimicrobial layer-forming solution (aqueous solution) containing an antimicrobial agent, which is a compound represented by the following Chemical Formula 1, at 0.2 wt % for a minute, then immersed in a basic aqueous solution including sodium carbonate at 0.2 wt % for 2 hours to remove unreacted residue, and washed for 30 minutes to manufacture a fouling resistance reverse osmosis membrane.

[Chemical Formula 1]

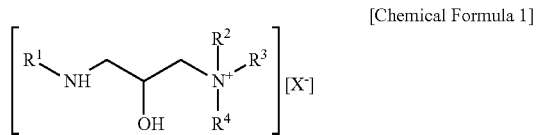

In Chemical Formula 1, $R^1$ represents a hydrogen atom, $R^2$ to $R^4$ each independently represent a methyl group, and $X^-$ represents $Cl^-$.

Examples 2 to 11 and Comparative Example 1

Fouling resistance reverse osmosis membranes were manufactured in the same manner as in Example 1 except that an antimicrobial agent content, an antimicrobial layer-forming solution treatment time, whether an antimicrobial layer was formed, and the like were changed as shown in Tables 1 to 3 below.

Comparative Example 2

A reverse osmosis membrane was manufactured in the same manner as in Example 1 except that N-2-aminoethyl-2,3,4,5,6-pentahydroxy hexanamide was used as an antimicrobial agent.

Comparative Example 3

A reverse osmosis membrane was manufactured in the same manner as in Example 1 except that an antimicrobial layer was formed by physical adsorption by impregnation with an aqueous solution containing glycidyltrimethylammonium chloride having no amine group at the termini thereof at 0.2 wt %.

Experimental Examples

The fouling resistance reverse osmosis membranes manufactured according to the examples and comparative examples were evaluated for the following physical properties, and results thereof are shown in Tables 1 to 3 below.

1. Evaluation of Antimicrobial Performance

The antimicrobial performance of the fouling resistance reverse osmosis membranes manufactured according to the examples and comparative examples was measured in accordance with a JIS Z 2010 film adhesion method. Microbial testing solutions, containing each of *Staphylococcus aureus* at an initial number of bacteria of $1.7 \times 10^4$ (number of bacteria/$cm^2$) and *Escherichia coli* at an initial number of bacteria of $1.6 \times 10^4$ (number of bacteria/$cm^2$), were inoculated in a sample, uniformly spread by covering the sample with a standard film, subjected to stationary culture at 35° C. and a relative humidity of 90% for 24 hours, and then neutralized with a neutralizing solution. Afterward, the solution was collected and incubated in a medium, and 24 hours later, the number of bacteria (number of bacteria/$cm^2$) was measured.

2. Evaluation of Flux and Salt Removal Rate

Each of the fouling resistance reverse osmosis membranes manufactured according to the examples and comparative examples was operated in a sodium chloride aqueous solution with a concentration of 2,000 ppm at 25° C. and 225 psi for an hour. Afterward, a sample was collected, and the flux and salt removal rate thereof were measured.

3. Evaluation of Anti-Fouling Properties

Each of the fouling resistance reverse osmosis membranes manufactured according to the examples and comparative examples was operated in sodium chloride aqueous solutions with a concentration of 2,000 ppm, containing each of dry milk at 50 ppm, dodecyltrimethylammonium bromide (DTAB) at 5 ppm, sodium dodecyl sulfate (SDS) at 50 ppm, and Triton-X100 at 5 ppm, at 25° C. and 225 psi for 2 hours, and the flux reduction rate relative to an initial flux was evaluated.

4. Evaluation of Endurance

Each of the fouling resistance reverse osmosis membranes manufactured according to the examples and comparative examples was operated sequentially in 0.1 wt % sodium hydroxide, 0.2 wt % hydrochloric acid, and raw water at 225 psi and 25° C. for an hour in each solution and cleaned with pure water. Afterward, the surface charge before and after the operation was measured. Endurance was verified by determining whether the antimicrobial layer on the surface was detached under acid and basic conditions according to a change in the surface charge measurement result (no change in surface charge value: ○, change in surface charge value: ×).

TABLE 1

| Classification | Example 1 | Example 2 | Example 3 | Example 4 | Example 5 |
| --- | --- | --- | --- | --- | --- |
| Antimicrobial agent content (wt %) | 0.2 | 0.0005 | 0.003 | 0.01 | 0.45 |
| Antimicrobial layer-forming solution treatment time (sec) | 60 | 60 | 60 | 60 | 60 |

TABLE 1-continued

| Classification | | Example 1 | Example 2 | Example 3 | Example 4 | Example 5 |
|---|---|---|---|---|---|---|
| Type of antimicrobial agent | | Chemical Formula 1 | Chemical Formula 1 | Chemical Formula 1 | Chemical Formula 1 | Chemical Formula 1 |
| Antimicrobial layer bonding method | | Chemical | Chemical | Chemical | Chemical | Chemical |
| Antimicrobial performance | *Staphylococcus aureus* (number of bacteria/cm$^2$) | $2.1 \times 10$ | $8.2 \times 10^3$ | $9.1 \times 10^2$ | $9.7 \times 10$ | $1.5 \times 10$ |
| | *Escherichia coli* (number of bacteria/cm$^2$) | <0.63 | $5.4 \times 10^3$ | $4.9 \times 10$ | 2.4 | <0.63 |
| Flux (GFD) | | 27.45 | 27.54 | 27.53 | 27.50 | 25.71 |
| Salt removal rate (%) | | 99.70 | 99.73 | 99.73 | 99.72 | 99.68 |
| Flux reduction rate (%) | Dry milk | −2.94 | −14.91 | −13.81 | −4.02 | −2.83 |
| | DTAB | −37.27 | −51.33 | −48.20 | −39.87 | −36.98 |
| | SDS | −13.99 | −14.88 | −14.65 | −14.23 | −13.81 |
| | Triton-X100 | −3.84 | −15.14 | −11.17 | −5.13 | −3.72 |
| Endurance | | ○ | ○ | ○ | ○ | ○ |

TABLE 2

| Classification | | Example 6 | Example 7 | Example 8 | Example 9 | Example 10 |
|---|---|---|---|---|---|---|
| Antimicrobial agent content (wt %) | | 0.55 | 0.7 | 0.2 | 0.2 | 0.2 |
| Antimicrobial layer-forming solution treatment time (sec) | | 60 | 60 | 3 | 20 | 240 |
| Type of antimicrobial agent | | Chemical Formula 1 | Chemical Formula 1 | Chemical Formula 1 | Chemical Formula 1 | Chemical Formula 1 |
| Antimicrobial layer bonding method | | Chemical | Chemical | Chemical | Chemical | Chemical |
| Antimicrobial performance | *Staphylococcus aureus* (number of bacteria/cm$^2$) | $1.5 \times 10$ | $1.4 \times 10$ | $7.6 \times 10^3$ | $9.2 \times 10$ | $1.7 \times 10$ |
| | *Escherichia coli* (number of bacteria/cm$^2$) | <0.63 | <0.63 | $5.1 \times 10^3$ | 2.1 | <0.63 |
| Flux (GFD) | | 23.74 | 20.90 | 27.54 | 27.51 | 25.95 |
| Salt removal rate (%) | | 99.58 | 99.42 | 99.73 | 99.73 | 99.69 |
| Flux reduction rate (%) | Dry milk | −2.81 | −2.79 | −14.70 | −3.86 | −2.88 |
| | DTAB | −36.90 | −36.85 | −50.42 | −38.11 | −37.02 |
| | SDS | −13.77 | −13.71 | −14.94 | −14.27 | −13.78 |
| | Triton-X100 | −3.70 | −3.68 | −15.24 | −4.96 | −3.69 |
| Endurance | | ○ | ○ | ○ | ○ | ○ |

TABLE 3

| Classification | | Example 11 | Comparative Example 1 | Comparative Example 2 | Comparative Example 3 |
|---|---|---|---|---|---|
| Antimicrobial agent content (wt %) | | 0.2 | — | 0.03 | 0.2 |
| Antimicrobial layer-forming solution treatment time (sec) | | 650 | — | 60 | 60 |
| Type of antimicrobial agent | | Chemical Formula 1 | — | Other type[1] | Other type[2] |
| Antimicrobial layer bonding method | | Chemical | — | Chemical | Physical |
| Antimicrobial performance | *Staphylococcus aureus* (number of bacteria/cm$^2$) | $1.6 \times 10$ | $2.4 \times 10^4$ | $1.9 \times 10^3$ | $7.8 \times 10$ |
| | *Escherichia coli* (number of bacteria/cm2) | <0.63 | $1.1 \times 10^4$ | $1.1 \times 10^3$ | 4.3 |
| Flux (GFD) | | 20.73 | 27.55 | 27.40 | 27.44 |
| Salt removal rate (%) | | 99.41 | 99.73 | 99.62 | 99.57 |
| Flux reduction rate (%) | Dry milk | −2.78 | −16.85 | −14.50 | −7.02 |
| | DTAB | −36.91 | −57.95 | −49.72 | −41.56 |
| | SDS | −13.77 | −15.83 | −14.89 | −14.43 |
| | Triton-X100 | −3.68 | −18.11 | −13.26 | −7.57 |
| Endurance | | ○ | — | ○ | × |

[1] In Comparative Example 2, N-2-aminoethyl-2,3,4,5,6-pentahydroxy hexanamide was used as an antimicrobial agent.
[2] In Comparative Example 3, an antimicrobial layer was formed by physical adsorption by impregnation with an aqueous solution containing glycidyltrimethylammonium chloride having no amine group at the termini thereof.

As shown in Tables 1 to 3, it can be seen that Examples 1, 3 to 6, 9, and 10, which satisfied all of the conditions according to the present invention (such as an antimicrobial agent content, an antimicrobial layer-forming solution treatment time, whether an antimicrobial layer was formed, a type of antimicrobial agent, a bonding method of an antimicrobial layer and a polyamide layer, and the like), exhibited excellent antimicrobial performance, an excellent flux, an excellent salt removal rate, and a low flux reduction rate, and thus remarkably excellent anti-fouling properties can be exhibited, as compared to Examples 2, 7, 8, and 11 and Comparative Examples 1 to 3 which did not satisfy at least one of the above-listed conditions.

According to the fouling resistance reverse osmosis membrane, method of manufacturing the same, and fouling resistance reverse osmosis module including the same of the present invention, anti-fouling properties against fouling materials such as organic substances, inorganic substances, and the like and antimicrobial performance against microorganisms and the like can be excellent, and a flux, a salt removal rate, and retention of anti-fouling properties and antimicrobial performance can also be excellent.

Although the present invention has been described in detail with reference to exemplary embodiments of the present invention, the scope of the present invention is not limited to the exemplary embodiments. It should be understood by those skilled in the art that other exemplary embodiments may be proposed by adding, modifying, and eliminating components and these exemplary embodiments may also be included within the scope of the present invention.

What is claimed is:

1. A fouling resistance reverse osmosis membrane comprising:
    a porous support;
    a porous polymer support layer;
    a polyamide layer formed by interfacial polymerization of a first solution including a multifunctional amine compound and a second solution including a multifunctional acid halide compound; and
    an antimicrobial layer provided by covalent bonding of an antimicrobial agent, which is a compound represented by the following Chemical Formula 1, to at least a portion of a surface of the polyamide layer:

[Chemical Formula 1]

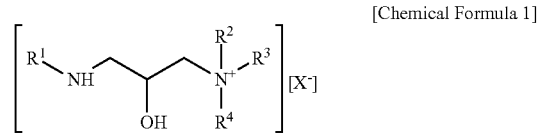

in Chemical Formula 1, $R^1$ to $R^4$ each independently represent a hydrogen ion or a $C_1$ to $C_{10}$ alkyl group, and $X^-$ represents a halide ion.

2. The fouling resistance reverse osmosis membrane of claim 1, wherein the antimicrobial layer is provided so as to entirely surround an outer surface of the polyamide layer.

3. A fouling resistance reverse osmosis module comprising the fouling resistance reverse osmosis membrane according to claim 1 or claim 2.

* * * * *